No. 747,046. PATENTED DEC. 15, 1903.
H. E. COWDREY.
SUN DIAL.
APPLICATION FILED SEPT. 4, 1903.
NO MODEL.
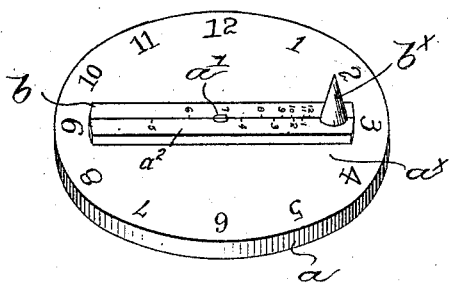
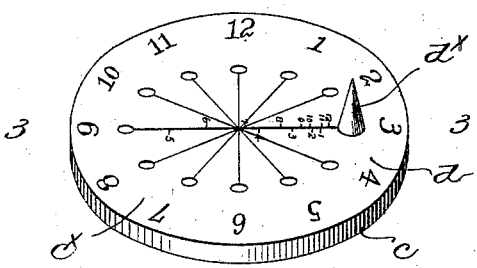
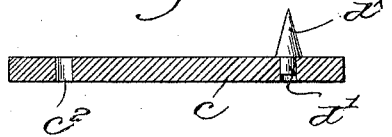
Witnesses,
Edward G. Allen
S. Wm. Lutton
Inventor,
Henry E. Cowdrey,
by Crosby & Gregory
Attys No. 747,046.                                   Patented December 15, 1903.

UNITED STATES PATENT OFFICE.

HENRY E. COWDREY, OF FITCHBURG, MASSACHUSETTS.

SUN-DIAL.

SPECIFICATION forming part of Letters Patent No. 747,046, dated December 15, 1903.

Application filed September 4, 1903. Serial No. 171,872. (No model.)

*To all whom it may concern:*

Be it known that I, HENRY E. COWDREY, a citizen of the United States, and a resident of Fitchburg, county of Worcester, State of Massachusetts, have invented an Improvement in Sun-Dials, of which the following description, in connection with the accompanying drawings, is a specification, like letters on the drawings representing like parts.

This invention has for its object the production of a simple and useful device for ascertaining with a fair degree of accuracy the hour of the day and therefrom to enable the points of the compass to be found.

By making the hour-scale in accordance with the general latitude of any given part of the country the hour of the day can be determined with sufficient accuracy upon any day when there is sufficient sunlight to cast a shadow. Having determined the hour, a simple manipulation of the device will give the direction of due south, and the other points of the compass can then be deduced at once.

Figure 1 is a perspective view of a device embodying one form of my invention. Fig. 2 is a similar view of a modification thereof, to be described; and Fig. 3 is a diametral section of the device shown in Fig. 2 on the line 3 3.

The device embodying my invention and which I have termed an "astronometer" comprises, essentially, a flat base $a$, Fig. 1, preferably made circular and of any suitable material. The upper face of said base is arranged to present a dial or clock-face $a^\times$, having thereon the numbers from "1" to "12" successively arranged in a circle adjacent the periphery of the base and equal distances apart. At the center of the base I pivot at $a'$ an elongated flat arm $a^2$, shown in Fig. 1 as extending diametrically above the dial and with its ends within the circle of numbers. Upon the upper face of the arm is made an hour-scale $b$, and at one end of the same is erected an upright index $b^\times$, preferably made conical or pointed.

Any suitable hour-scale may be used, and it may have a central longitudinal line and the morning hours arranged upon one side thereof and the afternoon hours upon the opposite side.

To use the device, the dial is set level and the arm $a^2$ is turned so that the sun will cast the shadow of the index on the central line of the hour-scale $b$. The number on the scale opposite the end of the shadow will indicate the hour of the day. The base is then turned until the number thereon corresponding to the indicated hour-number on the scale is toward the sun—*i. e.*, so that when the arm is swung to bring the index opposite such number on the base the index shadow will be cast on a radius intersecting such number on the dial. Then a line passing through the center of the dial and a point half way between the said number and the number "12" on the dial will point due south, so that the other points of the compass can be instantly determined.

In the modification, Figs. 2 and 3, the flat circular base $c$ has a clock-face dial $c^\times$ on its face, as before described; but within the line of numbers a series of holes or sockets $c^2$ are made—one adjacent each number. The hour scale $d$ is made directly upon the dial-face on a diametral line, and an index $d^\times$ is provided with a shank $d'$, Fig. 3, to enter any one of the holes $c^2$.

In order to determine the time, the index is inserted in the hole at the head of the hour-scale $d$ and the base $c$ turned so that the shadow cast by the index will fall on the scale, thereby indicating the hour. The index is then removed and inserted in the hole adjacent the number on the dial corresponding to such hour and the dial turned to cause the index shadow to fall on a radius intersecting the hole in which the index is held. Thereupon the direction of due south is ascertained, as before described.

I prefer the construction shown in Fig. 1, because the index can be set with accuracy to any fraction of an hour on the dial to correspond with the ascertained time of day, while it is inconvenient to form in the base a great number of holes or sockets in the modified form of my invention.

In either form in which my invention is embodied, however, the desired facts can be ascertained with sufficient accuracy by the exercise of a very small amount of care and skill.

Having fully described my invention, what I claim as new, and desire to secure by Letters Patent, is—

1. In a device of the class described, a flat base having the numbers from 1 to 12 displayed in a circle thereon and equidistant from each other, a movable index supported on the base at right angles to its face, and movable relatively to the base to a position adjacent any of said numbers, and an hour-scale extended diametrically of the base, to denote the hour by the shadow of the index cast thereon.

2. In a device of the class described, a circular dial provided with twelve equidistant radial lines numbered successively from 1 to 12, an upright, index movable relatively to and supported on the dial and adapted to be placed on any radius adjacent the periphery of the dial, and an hour-scale arranged diametrically of the dial, to indicate the hour by the shadow of the index cast thereupon.

3. In a device of the class described, a clock-face dial, an arm pivoted on the dial at its center and having an hour-scale on its upper face and an upturned index carried by the arm at one end of the scale and circularly movable therewith over the face of the dial, the hour being indicated by the shadow of the index cast upon the scale.

In testimony whereof I have signed my name to this specification in the presence of two subscribing witnesses.

HENRY E. COWDREY.

Witnesses:
CHARLES F. COWDREY,
CHAS. L. TENNEY.